Oct. 10, 1961  J. B. THOMAS  3,003,228
METHOD AND APPARATUS FOR EXPANSION OF UNBONDED
AREAS IN COMPOSITE PLATES
Filed May 26, 1955  3 Sheets-Sheet 1
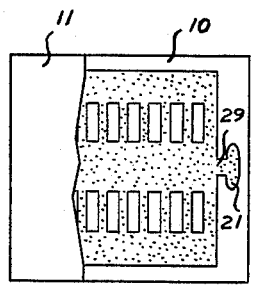
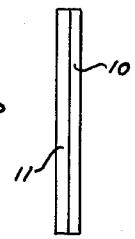
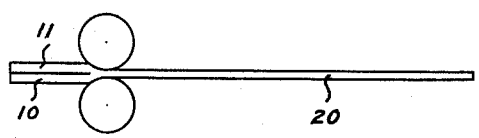
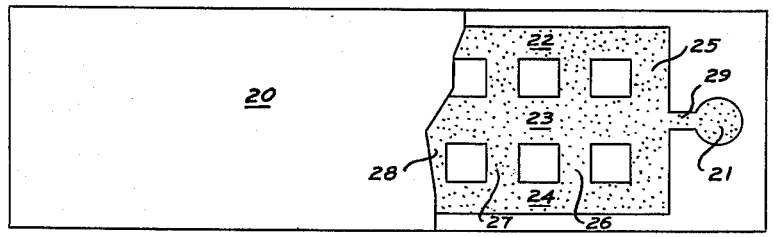
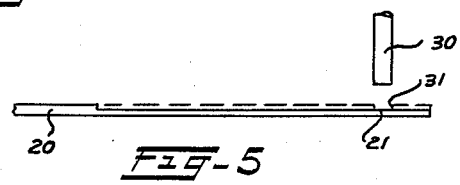
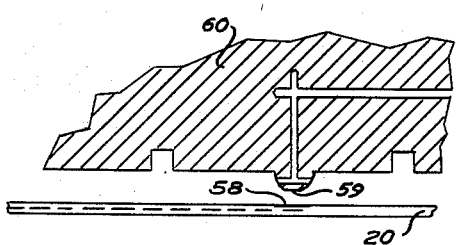
INVENTOR
JESSE B. THOMAS
BY Arthur Robert
ATTORNEY

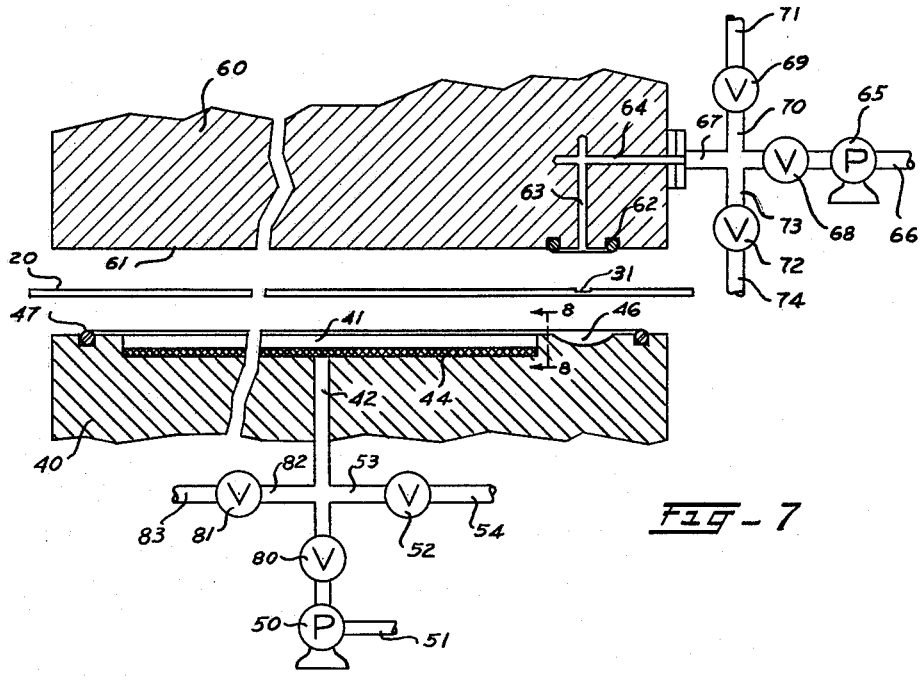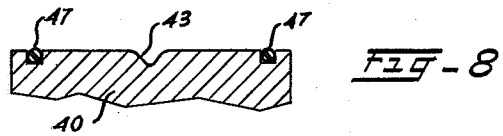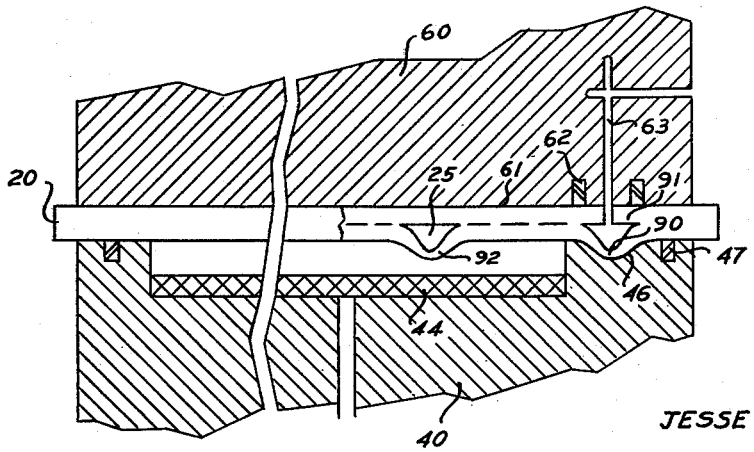

INVENTOR
JESSE B. THOMAS

United States Patent Office 3,003,228
Patented Oct. 10, 1961

3,003,228
METHOD AND APPARATUS FOR EXPANSION OF UNBONDED AREAS IN COMPOSITE PLATES
Jesse B. Thomas, Louisville, Ky., assignor to Reynolds Metals Company, Louisville, Ky., a corporation of Delaware
Filed May 26, 1955, Ser. No. 511,358
6 Claims. (Cl. 29—157.3)

This invention relates to an improved method and means for expanding composite plates.

In the art of expanding a composite plate composed of at least two bonded metal sheets, having therebetween a potential conduit-forming system of unbonded areas, one conventional method presently employed comprises: (1) providing a die structure having a pair of spaced opposed flat-faced platens mounted for relative movement between outer and inner positions, in which they are, respectively, spaced widely enough for plate receiving and discharging purposes and spaced more narrowly to restrict subsequent plate expansion to a desired degree; (2) placing said plate between platens in the outer position; (3) moving said platens to the inner plate-expanding position; and (4) introducing an expansion liquid under pressure into the between-sheet space extending along the unbonded areas of the plate to stretch-expand the unbonded areas of each face of the plate outwardly into flattening contact with the adjacent platen.

In some cases, it is desirable to expand only one face of the plate. It has been proposed to accomplish one side expansion by various methods, viz: by making one sheet ten times thicker than the other and then expanding the thin sheet with a pressure which is too small to expand the thick sheet; or by placing one flat face of the plate against one flat-faced platen, interposing a resilient blanket between the other flat face of the plate and the other platen and then subjecting the interior of the plate to the requisite expansion pressure, the blanket being relied upon to hold the one face of the plate flat against the one platen while permitting the other face of the plate to expand outwardly into the blanket. Obviously, the first process, if otherwise successful, is too restricted for general use. The second or resilient blanket method produces promising results.

During expansion, the resilient blanket exerts, against the bonded and unbonded areas of the plate, holding pressures which cannot be readily controlled, regulated or predetermined, and which vary in relation to each other, such holding pressures along the expanding unbonded areas increasing progressively with and in opposition to the expansion while that along the bonded areas either increases at a lower rate or, possibly, even decreases.

I have now found a way of producing one side expansion results which are consistently superior to those produced by the resilient blanket method and such forms the principal object of the present invention.

Another important object of the present invention is to provide a novel method of and means for exerting, against an expanding side or face area of the plate, a controllable or regulatable and predeterminable uniform holding pressure of a sufficient order of magnitude to hold the other side of the plate in firm flat-faced engagement with the other platen of the die while permitting the unbonded areas on the expanding side or face area of the plate to be easily and quickly expanded in the conventional manner.

In accordance with my invention, the foregoing and other objectives are accomplished simply by applying a holding fluid under pressure to one face area of said plate adjacent one platen so as to press and hold the other face area, opposite the one face area, of the plate firmly against the other platen of the die while an expansion fluid under higher pressure is introduced into the between-sheet space extending along said unbonded areas to stretch-expand the unbonded areas of said one face area outwardly against the pressure of said holding fluid and toward said one platen. For example, I have obtained good results with an external liquid holding pressure of 600 p.s.i. on a plate, having a free rupture pressure approximating 1,000 p.s.i., while using an internal liquid expansion pressure of 3,000 p.s.i.

The foregoing, as well as other objects and advantages will become more apparent when the following description is considered in conjunction with the accompanying drawings wherein:

FIG. 1 is a broken away plan view of a blank or sheet from which a composite plate is formed;

FIG. 2 is an end view of the blank of FIG. 1;

FIG. 3 is a schematic view of a roll bonding procedure applied to the blank;

FIG. 4 is a broken away plan view of the composite plate;

FIG. 5 is a schematic view of one arrangement for penetrating the roll-bonded sheet at the initial point to which expansion pressure will be applied;

FIG. 6 is a schematic view of an arrangement for locating the initial point in the composite plate to which expansion pressure will be applied;

FIG. 7 is a partial sectional view indicating the relative positioning of the composite plate and cooperating press members prior to the expansion, this view also showing a suitable pressure fluid system;

FIG. 8 is a sectional view taken on line 8—8 of FIG. 7;

FIG. 9 is a sectional view drawn to an exaggerated vertical scale showing the positioning of the composite plate at the beginning of the expansion operation, the pressure fluid connections being omitted;

Figure 10:
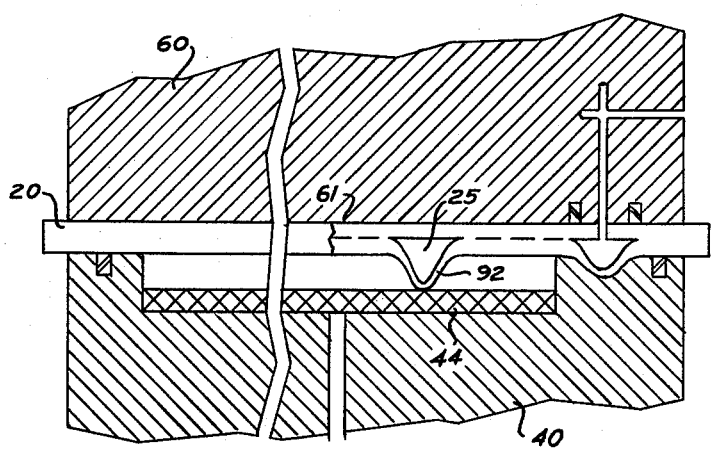
FIG. 10 is a view similar to FIG. 9 and showing the composite plate at an intermediate stage of the expansion operation.

The invention is useful generally with a variety of sheet metal materials having suitable bonding characteristics and is not to be considered as limited to any one material. With this in mind, a specific application using aluminum sheet is described below.

The composite plate 20, shown in FIG. 4, is composed of at least two bonded metal sheets having a potential conduit-forming system of unbonded areas between sheets. It may be made by furnace brazing, or matched die press welding or other suitable processes known to the art. Preferably it is made by the conventional roll bonding process indicated in FIGURES 1–3 which comprises: (1) provide a pair of foreshortened rectangular aluminum sheets 10 and 11, each approximating 0.140 inch in thickness; (2) prepare them by washing in a caustic bath to clean the sheets, rinse in water, wash in an acid bath to remove the oxide coating, rinse and dry; (3) imprint a foreshortened weld resist pattern upon one sheet; (4) superpose the other sheet over the one sheet and tack weld the superposed sheets; (5) heat to 900–950° F. (482–510° C.); (6) hot roll reduce approximately 58% from the overall thickness of .280 down to the range of .115 to .120; (7) heat to 800—875° F. (426–469° C.); (8) hot roll reduce to .060–.080"; (9) cold roll reduce approximately 4% to straighten; and (10) anneal at 800–900° F. for 5 to 10 minutes.

As a result of these known steps of manufacture, the composite plate 20 of FIG. 4 has a length in the order of four to five times the length of the original sheets and a thickness in the order of ¼ to ⅓ the thickness of those sheets, but its width remains substantially unchanged from the original width of the sheets. Furthermore, those portions of the sheets, which were not separated by the weld resist, are now intimately bonded integrally together while those portions which were separated by the weld resist are still separated in the form of laminations. Accordingly, the term "partially laminated," as used herein, is intended to refer to any type of plate having united portions surrounding and lying between non-bonded portions separated by stop-weld material and providing a potential continuous passageway.

During the thus described preparation of the composite plate 20, the weld resist material likewise has been thinned and extended in a "longitudinal" direction. The resist pattern includes a supplementary section 21, which communicates, through a neck portion 29, with the remainder of the resist material in order to provide a convenient entrance into the laminated areas of the composite plate. Furthermore, the design of certain articles calls for both longitudinal and transverse flow channels; hence, the weld resist pattern includes a plurality of longitudinal passage forming areas 22, 23 and 24, and of intersecting transverse passage forming areas 25, 26, 27 and 28 as shown in FIG. 4.

With the composite plate prepared as thus described, various ways of applying pressure fluid to the interior of the plate may be employed. As shown in FIG. 6 an upper platen 60 of a press, later to be described, may be provided with a projection 59, which is adapted to rupture the upper sheet of the plate at a predetermined position 58 corresponding to entrance area 21. As indicated in FIG. 5, a suitable tool 30 may be employed to cut away a small aperture or indentation 31 in the top sheet of the plate immediately above the weld-resist extension or entrance area 21. This aperture may be formed either to expose the weld resist in the top sheet, just above the weld resist 21, or to leave a thin diaphragm which can be ruptured by the expansion fluid. In any event, however, it should not extend into the lower sheet, since this would tend to weaken the structure sufficiently to interfere with further processing. Suitable conventional means, not shown, may be used to limit the extent of penetration of tool 30 to the degree thus described.

In FIG. 7, an improved press, suitable for carrying out the desired stages of expansion of the above described plate, is shown partly in section and partly in diagrammatic form. A lower platen 40, which conveniently may be stationary, is provided on its upper surface with a fluid reservoir space or pressure chamber 41 to which fluid can be supplied or withdrawn through a conduit 42. Surrounding the reservoir on all sides is a ledge forming the upper surface of the platen and against which the plate 20 is adapted to be firmly clamped in its peripheral bonded region.

The ledge contains recesses 46 and 43 which correspond respectively to the extension 21 and the neck 29 of the resist material and which communicate with the reservoir space 41, as best shown in FIG. 8. The periphery of platen 40, contains a groove for a suitable O-ring 47 which is adapted to seal the reservoir space 41 against the superposed plate 20 when in contact therewith. This ring may be of any conventional deformable sealing material suitable for high pressure usage, as for example neoprene, natural rubber or synthetic rubber.

A porous die face member 44 is removably placed within the reservoir space 41 to form the floor thereof. It comprises a plate or mat of sintered metal adapted to resist high compression stresses and simultaneously to permit flow of fluid therethrough and therearound. This porous member 44 may conveniently be formed of a powdered metal pressed into sheet or mat form and preferably is ribbed or grooved at its bottom and along its periphery.

For the purpose of supplying the holding or anchoring pressure fluid, a heavy duty pump 50 is arranged to draw from supply conduit 51 and to discharge into conduit 42. A check valve 80, adapted to open when fluid is supplied to reservoir 41 and to close when fluid is discharged from that reservoir, is mounted in conduit 42 on the discharge side of the pump. The holding pressure fluid system includes a pressure relief valve 52 of any conventional nature in a branch conduit 53 connecting to conduit 42. When the holding pressure of the fluid is conduit 42 or reservoir 41 exceeds the setting of valve 52, a sufficient amount of fluid accordingly is automatically bled out into a discharge conduit 54, as later will become apparent.

The holding pressure fluid system also includes an intermittently operable discharge valve 81 in a branch conduit 82 connecting to conduit 42 and is adapted to discharge fluid from reservoir 41 into outlet conduit 83 after the completion of the expansion operation. As will later be described, this valve which operates once for each plate being processed, is coordinated, in any suitable manner known to the art and by appropriate connections, not shown, with a similarly functioning valve in the expansion pressure fluid system.

Mounted above the platen and the fluid system thus far described is an upper platen 60, preferably movable, which is provided with a flat smooth surface 61. At a location corresponding to the approximate planar center of recess 46 in the lower platen, the upper platen may be provided with a centrally bored projecting member 59 as shown in FIG. 6, or alternately may be provided with a simple bore 63 as shown in FIG. 7. It will be understood that when the entrance to the resist extension 21 is made by a separate aperturing operation, the upper platen requires no separate member 59, whereas, when the entrance is made by a puncturing action during the clamping of the composite plate in the press, such a separate member preferably is used. In either event, however, the upper platen is provided with a circular recess, on its surface, surrounding the bore therein, which recess contains an O-ring 62 of sealing material.

A second bore 64 communicating interiorly of the platen with bore 63 is adapted at its outer end to be connected to the expansion pressure fluid system. In this system a heavy duty pump 65 is arranged to draw from supply conduit 66 and to discharge into conduit 67 which is connected to bore passage 64. A check valve 68, adapted to open when fluid is supplied to bore 64 and to close when fluid is discharged from that bore, is mounted in conduit 67 on the discharge side of the pump. Also a pressure relief valve 69, of any conventional nature, is mounted in a branch conduit 70 connecting to conduit 67.

When the pressure of the fluid in bore 64 and in the interior of the article being processed, exceeds the setting of valve 69, a sufficient amount of fluid accordingly is automatically bled out into a discharge conduit 71. The expansion pressure fluid system additionally includes an intermittently operable discharge valve 72 in a branch conduit 73 connecting to conduit 67. This valve controls the discharge of fluid from the interior of the expanded plate into outlet 74 after the completion of the expansion operation. As in the case of discharge valve 81, valve 72 operates once for each plate being processed and is coordinated with the operation of valve 81.

Figure 11:
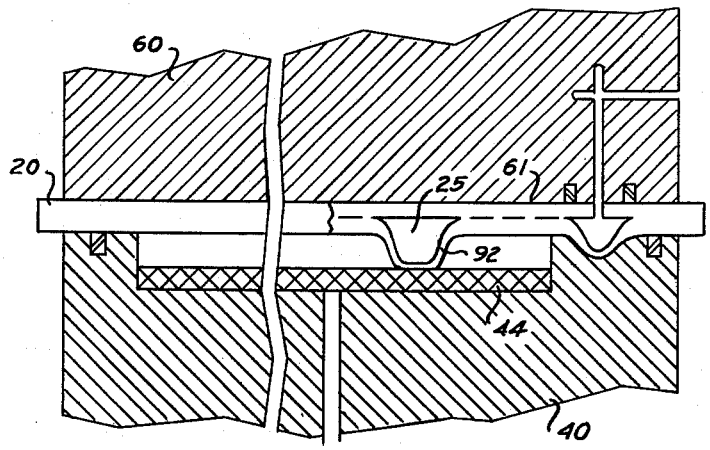
FIG. 11 is a view similar to FIG. 9 and showing the composite plate at the conclusion of the expansion operation.

With the foregoing in mind, reference now is made to FIGS. 9, 10 and 11, showing various stages of the unilateral expansion of the composite plate 20. It will be understood that either a liquid or a highly compressed gas may be used for either or both of the expansion and holding pressure fluids. Moreover, since the processing of the plate usually takes place at room temperatures, no formation of vapor is involved when a liquid, such as water, is used. In order to depict the expansion more clearly an enlarged vertical scale of the plate 20 is employed in the figure now to be described.

Having first located the composite plate 20 between the press platens, with aperture 31 above recess 46 and below bore 63, the press may now be closed. At this time a part of the outer bonded periphery of the plate rests upon the O-ring 47 and the extreme peripheral edge is extended well out upon the ledge of the lower platen and preferably to or beyond the edge of that platen. As the press is closed, both O-rings 47 and 62 are compressed against the plate forming tight seals therewith. Pump 50, with valve 52 set at the desired relief pressure, is then actuated to fill reservoir space 41 with a suitable fluid under pressure. Due to its construction the die face member 44 permits this fluid to flow into the upper portion of the reservoir without displacing the member from its normal position at the floor of that reservoir. The fluid thus supplied presses upwardly against composite plate 20 in a uniform manner against all of the exposed surface or face area of the same and anchors the plate firmly against the flat surface 61 of the upper platen.

When using a substantially non-compressible medium, such as water, for the expansion resisting, or holding pressure fluid, and when processing a composite plate of 2S aluminum having a thickness of .060 inch and a passage width of about ⅜ inch, a holding pressure within the range of 600 to 3600 p.s.i. generally is adequate. It will be understood that other ranges of pressures will be used with different types of metal and with different thicknesses of metal.

Immediately after the plate is held firmly against the surface 61 of the upper platen by the pressure from pump 50, the cooperating pump 65 is actuated to force a suitable fluid into conduit 67 and thence into the bore 63 of the upper platen. Relief valve 69 meanwhile is set at a desired pressure, which may be of the order of 500 to 3600 p.s.i. greater than the relief setting of valve 52.

Progressively better results can be obtained with progressively higher holding pressures. The reason for this can be readily understood when it is appreciated that the internal expansion pressure tends to expand the unbonded area from its original cross-sectional shape, which is in the form of a flat loop, to an expanded cross-sectional shape which is in the form of a full circle. The holding pressure tends to pin the bonded areas at opposite ends of the flat loop to the adjacent platen of the die and thus opposes the tendency of the internal expansion pressure to force the ends of the loop away from the platen during the full circle development. With a differential of 2,400 p.s.i. between the holding and expansion pressures, a holding pressure of 600 p.s.i. is only 20% of the expansion pressure. Since this holding pressure was fairly successful in resisting an expansion pressure which is five times higher, it follows that holding pressures of 1,600 and 5,600 p.s.i. which are equal to 40% and 70%, respectively, of expansion pressures of 4,000 and 8,000 p.s.i., should give progressively better results.

As the internal expansion pressure exerted by pump 65 first equals and then exceeds the holding pressure applied by pump 50, the laminated portions of plate 20 are subjected to greater and greater stresses until the desired stretch-expanding of metal begins. For example, as the expansion pressure fluid from pump 65 first enters aperture 31, located in the extension 21 of weld resist in the clamped plate 20, as viewed in FIG. 9, it is first applied to the lower lamina 90 of the sheet below bore 63. When a differential pressure of about 600 p.s.i. is reached the sheet is bulged downwardly at 90 to fill the recess 46 and at the same time the higher expansion pressure holds the separated upper portion 91 of the sheet against the surface 61 of the upper platen.

While this is occurring, the same expansion fluid has sought other areas of lesser resistance and has separated the laminations corresponding to neck passage 29, as well as the laminations corresponding to longitudinal passages 22, 23 and 24, and the laminations corresponding to intersecting transverse passages 25, 26, 27 and 28. In FIGS. 9 to 11, the expansion taking place in a representative intersecting transverse passage 25 is depicted, but it will be understood that the same expansion is occurring in the other passages simultaneously.

It will be appreciated that the expanding surfaces of the plate are being held by a deformable body of fluid whose pressure is applied uniformly to all surfaces in contact with that fluid, on one side of the plate and that this holding pressure is of an order of magnitude determined by the operator. This feature is a significant part of this invention.

Referring now to FIGS. 7 and 10, as additional fluid is supplied to the interior of the plate by pump 65, the lower lamination 92 of the passage 25 touches the upper surface of the die face member 44 and thereafter is permitted to expand only in a transverse direction. Continued application of fluid to the interior of passage 25 results in progressive expansion of the lamination 92 and in the broadening and flattening of the lower extremity of the passage. In FIG. 11, representing the conclusion of the unilateral expansion, the lower lamination 92 of passage 25 is provided with the desired flat outer surface.

The use of the porous floor member 44 prevents any of the holding pressure fluid from being trapped in the pressure welded areas of the sheet which are entirely surrounded by expanding or expanded passages. For example, it will be noted that the longitudinal passages 22—24 cooperate with the transverse passages 25—28 to form waterways extending completely around a number of pressure welded rectangular areas. If these passages were to expand outwardly into uniform contact with an impervious floor, then whatever holding liquid is contained within the pocket formed by the plate and the floor may be trapped. The porous plate, however, prevents such entrapment and insures the application of a uniform holding pressure against all adjacent surfaces of the plate.

Various ways of relieving these pressures after completion of the expansion can be used. For example, valve 72 can be opened, manually or automatically, sufficiently to reduce the expansion pressure down to the value of the holding pressure, whereupon valve 81 can be opened, manually or automatically, sufficiently to permit a simultaneous reduction of the holding pressure down to atmospheric while the expansion pressure also is being reduced to atmospheric.

Alternately both valves 72 and 81 can be opened simultaneously with a greater rate of pressure reduction taking place in valve 72 so that both pressure systems reach atmospheric at the same time.

After the pressures are relieved, press platen 60 is raised and the unilaterally expanded article is removed and subjected to other fabrication steps to form the completed article of commerce.

One advantage of the system described is the rapidity with which the expansion may be conducted. Use of conventional pumps, valves, presses and control means permits the entire cycle of operation to be completed in a short time and with a minimum of manual operation.

Having described my invention, I claim:

1. A method of expanding a bonded passageway panel having front and back face areas containing bonded and unbonded portions including corresponding front and back bonded portions flanking the opposite edges of corresponding front and back unbonded unexpanded portions which cooperate to provide a potential internal passageway between them, comprising: clamping the panel between front and back platens with the back platen in face-to-face relationship with the back bonded and unbonded portions of the panel and with the front platen recessed to cooperate with said front bonded and unbonded portions of the panel to define the inner walls of a closed pressure chamber located between the front platen and said front bonded and unbonded portions; introducing a holding fluid under pressure into said closed pressure chamber to urge the bonded and unbonded portions of both front and back face areas of the clamped panel toward said back platen and thereby force at least the said back bonded portions into and hold them in tight face-to-face engagement with said back platen while leaving the said front unbonded portion free to expand into said pressure chamber against the force of said holding pressure during the expansion operation; and performing the expansion operation by applying to the interior of said clamped panel between said front and back unbonded portions an expansion fluid under an expansion pressure which is sufficiently higher than said holding pressure to expand said unbonded front face portion into said pressure chamber while the force of said holding pressure, acting through the front and back bonded portions, is effective to prevent the expansion of the back unbonded portion.

2. A method of expanding a bonded passageway panel having front and back faces and corresponding front and back bonded portions flanking the opposite edges of corresponding front and back unbonded portions which cooperate to provide a potential internal passageway between them, comprising: positioning said panel with bonded and unbonded portions of its back face in face-to-face relationship with corresponding surface portions of an adjacent rigid platen; applying a super atmospheric holding fluid pressure against said front face over said front bonded and unbonded portions to pin said back bonded and unbonded portions against said platen and in face-to-face contact with said corresponding surface portions thereof; and performing the expansion operation by applying to the interior of said panel between said front and back unbonded portions an expansion fluid under a pressure which is sufficiently higher than said holding fluid pressure to expand said front unbonded portion outwardly against said holding pressure.

3. An apparatus for expanding a bonded passageway panel having front and back faces and corresponding front and back bonded portions flanking the opposite edges of corresponding front and back unbonded portions which cooperate to provide a potential internal passageway between them, comprising: a pair of platens arranged in spaced opposed relationship to receive the panel between them; means supporting said platens for relative movement inwardly toward and outwardly away from each other between a narrow panel expansion spacing and a wider panel-receiving spacing; one of said platens including a back platen surface, which, when a panel is operatively interposed between platens, has face-to-face relationship with the back bonded and unbonded portions of the interposed panel; the other of said platens having a recess to be covered and closed by the front bonded and unbonded portions of the interposed panel to form a pressure chamber; means for introducing a holding fluid under pressure into said pressure chamber to force the bonded and unbonded portions of both front and back faces of the panel toward said back platen surface and thereby force the back bonded and unbonded portions into and hold them in tight face-to-face engagement with said back platen surface while leaving the front unbonded portion free to expand into said pressure chamber against the force of said holding pressure during the expansion operation; and means for introducing a higher expansion fluid pressure into the interior of the panel between the front and back unbonded portions to expand the unbonded front face portion into said pressure chamber against the force of said holding pressure.

4. The apparatus of claim 3 wherein: said recess in the recessed platen has a flat bottom adapted to engage the expanding front portions of the panel for limiting their expansion.

5. The apparatus of claim 4 including: fluid sealing means surrounding said recess and located between the recessed platen and the panel to confine said holding pressure to said pressure chamber.

6. A method of expanding a bonded passageway panel having front and back face areas containing bonded and unbonded portions including corresponding front and back bonded portions flanking the opposite edges of corresponding front and back unbonded unexpanded portions which cooperate to provide a potential internal passageway between them, comprising: inserting the unexpanded panel between two platens, one having a recess which is smaller in area than the panel, and positioning said panel to align one face area with said recess; moving the two platens relatively toward each other to clamp the panel between the platens and thereby close the recess; introducing a holding fluid under pressure into the closed chamber formed by the recess and the panel to force the panel against the other platen; and thereafter introducing a fluid under pressure into the unbonded portions of the panel at a pressure greater than the holding pressure to expand said unbonded portions into said recess against the pressure of the holding fluid while the bonded portions of the panel are held against said other platen by the holding fluid.

References Cited in the file of this patent

UNITED STATES PATENTS

| | | |
|---|---|---|
| 1,561,312 | Cuttler et al. | Nov. 10, 1925 |
| 2,175,204 | Lougheed | Oct. 10, 1939 |
| 2,284,773 | Sivian et al. | June 2, 1942 |
| 2,317,869 | Walton | Apr. 27, 1943 |
| 2,582,358 | Schoellerman | Jan. 15, 1952 |
| 2,649,067 | Kranenberg | Aug. 18, 1953 |
| 2,662,273 | Long | Dec. 15, 1953 |
| 2,690,002 | Grenell | Sept. 28, 1954 |
| 2,740,188 | Simmons | Apr. 3, 1956 |
| 2,756,487 | Heidorn | July 31, 1956 |

FOREIGN PATENTS

| | | |
|---|---|---|
| 915,325 | Germany | July 19, 1954 |